US008599500B2

(12) United States Patent
Ohashi

(10) Patent No.: US 8,599,500 B2

(45) Date of Patent: Dec. 3, 2013

(54) IMAGING LENS, CAMERA AND PERSONAL DIGITAL ASSISTANT

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 13/372,983

(22) Filed: Feb. 14, 2012

(65) Prior Publication Data

US 2012/0212838 A1 Aug. 23, 2012

(30) Foreign Application Priority Data

Feb. 18, 2011 (JP) ................................ 2011-033612

(51) Int. Cl.
*G02B 9/04* (2006.01)
*G02B 9/62* (2006.01)

(52) U.S. Cl.
USPC ............................ 359/795; 359/761; 359/793

(58) Field of Classification Search
USPC .......................... 359/752, 753, 761, 793, 795
See application file for complete search history.

(56) References Cited

U.S. PATENT DOCUMENTS 3,384,434 A * 5/1968 Scidmore et al. ............ 359/644
4,806,001 A 2/1989 Okabe et al.
5,398,135 A 3/1995 Ohashi
5,576,891 A 11/1996 Ohashi
5,617,254 A 4/1997 Ohashi
5,687,401 A 11/1997 Kawamura et al.
5,760,973 A 6/1998 Kawamura
6,353,506 B1 3/2002 Ohashi
6,525,885 B2 2/2003 Ohashi
6,771,433 B2 8/2004 Ohashi
6,829,102 B2 12/2004 Ohashi et al.
6,839,183 B2 1/2005 Ohashi
6,839,185 B2 1/2005 Ohashi
6,995,921 B2 2/2006 Ohashi
7,038,858 B2 5/2006 Ohashi
7,095,564 B2 8/2006 Ohashi
7,151,638 B2 12/2006 Ohashi
7,164,542 B2 1/2007 Ohashi (Continued)

FOREIGN PATENT DOCUMENTS

JP 62-173415 7/1987
JP 63-24213 2/1988

(Continued)

OTHER PUBLICATIONS

The Extended European Search Report issued Jun. 11, 2012, in Application No. / Patent No. 12156024.7-2217.

*Primary Examiner* — William Choi

(74) *Attorney, Agent, or Firm* — Oblon, Spivak, McClelland, Maier & Neustadt, L.L.P.

(57) ABSTRACT

An imaging lens includes in order from an object side a first lens group including a positive refractive power and a second lens group having a negative refractive power, the first lens group and the second lens group including a widest air space therebetween, the first lens group including in order from the object side a negative first lens having a concave face on the object side, a positive second lens having a convex face on both sides, an aperture stop, a negative third lens having a concave face on the object side, a positive fourth lens having a convex face on an image side and a positive fifth lens having a convex face on the image side, and the second lens group including a negative meniscus sixth lens having a concave face on the object side.

12 Claims, 10 Drawing Sheets

(56) References Cited

U.S. PATENT DOCUMENTS

| | | | |
|---|---|---|---|
| 7,167,320 | B2 | 1/2007 | Ohashi |
| 7,304,803 | B2 | 12/2007 | Ohashi |
| 7,379,249 | B2 | 5/2008 | Ohashi |
| 7,420,745 | B2 | 9/2008 | Ohashi |
| 7,443,612 | B2 | 10/2008 | Suzuki |
| 7,535,650 | B2 | 5/2009 | Ohashi |
| 7,535,654 | B2 | 5/2009 | Ohashi |
| 7,554,746 | B2 | 6/2009 | Ohashi |
| 7,557,839 | B2 | 7/2009 | Ohashi |
| 7,589,910 | B2 | 9/2009 | Ohashi |
| 7,663,808 | B2 | 2/2010 | Ohashi |
| 7,672,066 | B2 | 3/2010 | Ohashi |
| 7,679,835 | B2 | 3/2010 | Ohashi |
| 7,855,842 | B2 | 12/2010 | Ohashi |
| 8,018,663 | B2 | 9/2011 | Ohashi et al. |
| 2004/0051964 | A1 | 3/2004 | Endo et al. |
| 2005/0280900 | A1 | 12/2005 | Toyama |
| 2010/0271710 | A1 | 10/2010 | Ohashi |
| 2011/0310496 | A1 | 12/2011 | Kubota et al. |
| 2011/0317285 | A1 | 12/2011 | Ohashi et al. |

FOREIGN PATENT DOCUMENTS

| | | |
|---|---|---|
| JP | 1-130118 | 5/1989 |
| JP | 9-236746 | 9/1997 |
| JP | 2000-321490 | 11/2000 |
| JP | 2005-352060 | 12/2005 |
| JP | 2009-216858 | 9/2009 |

* cited by examiner

IMAGING LENS, CAMERA AND PERSONAL DIGITAL ASSISTANT

PRIORITY CLAIM

The present application is based on and claims priority from Japanese Patent Application No. 2011-033612, filed on Feb. 18, 2011, the disclosure of which is hereby incorporated by reference in its entirety.

BACKGROUND

1. Technical Field

The present invention relates to an imaging lens, a camera and a personal digital assistant.

2. Description of the Related Art

There are a variety of functions and configurations used in a widespread digital camera. In recent years, a relatively large imaging element having about 20-45 mm diagonal length is used in such a digital camera, and a high image quality and compact camera equipped with a high-performance single focus lens has greatly drawn user's attention.

Most of user's requests relate to portability, namely, compactness as well as a high performance. A high performance requires at least a small collapse of a point image till a peripheral part of a field angle at high contrast with small coma flare in an opened state of an aperture stop, non-generation of unnecessary coloring in a portion having a large brightness difference with small chromatic aberration, and small distortion, in addition to a resolution corresponding to an imaging element having 10-20 million pixels.

Moreover, compactness requires the entire length when normalizing with a focal length or the maximum image height shorter than that when using a small imaging element because an actual focal length is increased due to a relatively large imaging element.

A large aperture at least less than F 2.8 is also required in view of differentiation from a general compact camera equipped with a zoom lens.

Many users desire a certain level of wide-field angle, and it is preferable for a half-field angle of an imaging lens to be 28° or more. A half-field angle of 28° corresponds to about 41 mm focal length converted into a 35 mm film camera (so-called Leica size).

An image from an imaging lens is imaged by an imaging element (area sensor) in a digital camera. In view of the property of the area sensor having a color filter and a micro lens with respect to each pixel, various retrofocus type lenses in which a lens group having a negative refractive power is arranged on the object side and a lens group having a positive refractive power is arranged on the image side are proposed as a wide-angle single focus lens which moves the exit pupil position away from the image face and is suitable for entering a peripheral light beam onto the sensor at an angle close to the perpendicular.

However, such a retrofocus type increases an entire length (distance from most object-side face to image face) of a lens, so that a digital camera can not be easily downsized.

In recent years, owing to an improvement in and optimization of an on-chip micro lens and progress in an image process in an imaging element having a relatively large diagonal length of about 20-45 mm, a certain level of oblique incidence of a peripheral light beam onto an imaging face is allowed.

That is, a system which can sufficinently allow up to about 30° in an angle between a main light beam and an optical axis in the maximum image height can be created.

If such a system is used, a lens type suitable for downsizing can be selected without regard to the vertical incidence of the peripheral light beam.

A lens type which is more suitable for downsizing than the retrofocus type includes an approximate symmetric type and a telephoto type in which a lens group having a negative refractive power is arranged on an image side.

An imaging lens of this type is described in Patent Documents 1 (Japanese Patent Application Publication No. S63-024213), 2 (Japanese Patent Application Publication No. H09-236746), 3 (Japanese Patent Application Publication No. 2000-321490), 4 (Japanese Patent Application Publication No. 2005-352060), 5 (Japanese Patent Application Publication No. 2009-216858), for example.

An imaging lens described in Patent Document 1 is a telephoto type having a four-group and four-lens configuration which is widely used in a compact film camera. It is small but it includes large distortion and astigmatism.

An imaging lens described in Patent Documents 2, 4 is small and has a high imaging performance, but it has 35° or more between the main light beam and the optical axis in the maximum image height. Because of this, it has a problem for use in a digital camera even if it is combined with the above-described imaging element.

An imaging lens described in Patent Document 3 has a large aperture but it includes many lenses, creating rising costs. An imaging lens described in Patent Document 5 has a large entire length compared with a focal length, so that it has a problem in downsizing.

An imaging lens described in Patent Documents 3-5 does not have a relatively large air space inside a lens system, and a large back focal length. For this reason, it is difficult to reduce the thickness of the imaging lens for housing even if a collapsed mechanism is used; thus, it is also difficult to downsize the imaging lens.

SUMMARY

The present invention has been made in view of the above circumstances, and an object of the present invention is to offer a small and high-performance imaging lens suitable for a digital camera with a wide angle in which a half-field angle is about 28-36°, a large aperture in which F-number is less than 2.8, a small number of lenses and a resolution corresponding to an imaging element having 10-20 million pixels, and a camera and a personal digital assistant using the imaging lens.

In order to achieve the above object, one embodiment of the present invention provides an imaging lens including in order from an object side a first lens group including a positive refractive power; and a second lens group having a negative refractive power, the first lens group and the second lens group including a widest air space therebetween, the first lens group including in order from the object side a negative first lens having a concave face on the object side, a positive second lens having a convex face on both sides, an aperture stop, a negative third lens having a concave face on the object side, a positive fourth lens having a convex face on an image side and a positive fifth lens having a convex face on the image side, and the second lens group including a negative meniscus sixth lens having a concave face on the object side.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Figure 1:
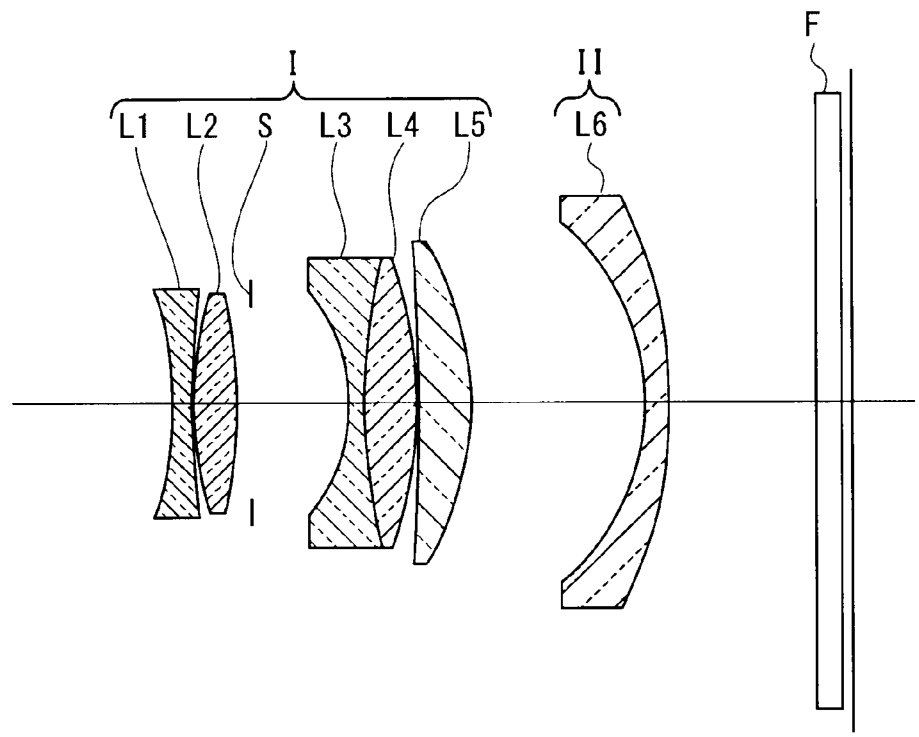
FIG. 1 is a view illustrating a configuration of an imaging lens according to Embodiment 1.

Hereinafter, an imaging lens, a camera and a personal digital assistant according to a first embodiment of the present invention will be described. Firstly, the basic embodiment of these will be described before describing specific embodiments including numerical values.

An imaging lens according to the first embodiment of the present invention includes in order from an object side a first lens group having a positive refractive power and a second lens group having a negative refractive power. The imaging lens includes the widest air space between the first lens group and the second lens group.

The first lens group includes in order from the object side a negative first lens having a concave face on the object side, a positive second lens having a convex face on both sides, an aperture stop, a negative third lens having a concave face on the object side, a positive fourth lens having a convex face on the image side, and a positive fifth lens having a convex face on the image side. The second lens group includes a negative meniscus sixth lens having a concave face on the object side.

The imaging lens includes six lenses as a whole.

As described above, the imaging lens includes a small number of lenses such as six lenses as a whole, so that the size and costs of the imaging lens can be reduced.

In the imaging lens, it is preferable for a distance L from the most object-side face of the first lens group to an image face in a state focused on an infinite object and a focal length f of the entire system in a state focused on an infinite object to satisfy the following condition (1).

$$1.2<L/f<2.0 \quad (1)$$

In the imaging lens, it is preferable for the focal length f of the entire system in a state focused on an infinite object and the maximum image height Y' to satisfy the following condition (2).

$$0.50<Y'/f<0.70 \quad (2)$$

In the imaging lens, it is preferable for the distance L from the most object-side face of the first lens group to the image face in a state focused on an infinite object and a distance $D_{1G\text{-}2G}$ from the most image-side face of the first lens group to the most object-side face of the second lens group in a state focused on an infinite object to satisfy the following condition (3).

$$0.15<D_{1G\text{-}2G}<0.50 \quad (3)$$

When the above condition is satisfied, the field curvature can be effectively reduced while the thickness of the imaging lens can be further reduced for housing with a collapsed mechanism.

In the imaging lens, it is preferable for a focal length of the second lens group $f_{2G}$ and the focal length f of the entire system in a state focused on an infinite object to satisfy the following condition (4).

$$-2.7<f_{2G}/f<-1.2 \quad (4)$$

When the above condition is satisfied, the refractive power of the second lens group can be optimized and the imaging lens can be further downsized.

In the imaging lens, it is preferable for a curvature radius $R_{L3F}$ of the object-side face of the third lens and a distance $D_{L2\text{-}L3}$ from the image-side face of the second lens to the object-side face of the third lens to satisfy the following condition (5).

$$-2.5<R_{L3F}/D_{L2\text{-}L3}<-1.0 \quad (5)$$

When the above condition is satisfied, the coma aberration can be well corrected.

In the imaging lens, it is preferable for a synthetic focal length $f_{L1\text{-}L2}$ of the first and second lenses and the focal length f of the entire system in a state focused on an infinite object to satisfy the following condition (6).

$$1.0<f_{L1\text{-}L2}/f<1.8 \quad (6)$$

When the above condition is satisfied, the refractive power balance in the first lens group can be optimized and the exit pupil position can be sufficiently moved away from the image face.

In the imaging lens, it is preferable for the fifth lens to include as the image-side face an aspheric shape in which a positive refractive power weakens in its peripheral portion. In this case, it is preferable for a distance $L_{s\text{-}A}$ from the aperture stop to the aspheric surface of the fifth lens and a distance $L_{s\text{-}I}$ from the aperture stop to the image face to satisfy the following condition (7).

$$0.25<L_{S\text{-}A}/L_{S\text{-}I}<0.55 \quad (7)$$

When the above condition is satisfied, the coma aberration and astigmatism can be well corrected.

In the imaging lens, the first lens can be only moved when focusing on a close-range object.

By moving only the first lens group, the focusing mechanism can be downsized and simplified while effectively controlling a change in an imaging performance along with the focusing on a finite-range object.

A camera of this embodiment is a camera including the imaging lens as a photographing optical system.

A personal digital assistant of this embodiment includes the imaging lens as a photographing optical system of a camera function portion.

Hereinafter, further description will be given.

The imaging lens includes a negative power on the most image side. The entire configuration of the lens is made to be closer to a so-called telephoto type so as to reduce the entire length and the size of the lens.

A telephoto type imaging lens for use in a film camera generally includes a large incident angle of a peripheral light beam to an image face, for example, 35-45°, which is not suitable for use in a digital camera. A small and high-performance imaging lens has a large number of lenses and a lot of aspheric surfaces, which result in an increase in the costs.

On the contrary, an imaging lens having an incident angle of the peripheral light beam onto the image face of about 30° or below, which is suitable for use in a digital camera, is not sufficient in terms of both downsizing and high performance. However, the above-described lens configuration can solve these problems.

That is, in order to provide the property of the telephoto type, the negative first lens is arranged on the most object side relative to the negative sixth lens (second lens group) arranged in the most image side in view of the symmetric property, so that the coma aberration, chromatic aberration of magnification and distortion can be easily corrected.

Moreover, with the concave face provided on the object-side face of the first lens, the coma aberration, chromatic aberration of magnification and distortion can be corrected with a good balance.

Furthermore, the negative sixth lens is optimized as a field flattener with the meniscus shape having a convex face on the object side provided in the negative sixth lens, so that a high imaging performance can be achieved as a whole.

The four lenses from the second to fifth lenses include an inverse Ernostar type as a whole, so that the spherical aberration and coma aberration can be preferably corrected even if a large aperture of less than F2.8 is used.

By providing the aperture stop between the second lens and the third lens which are arranged relatively on the object side in the lens system, the distance from the image face to the exit pupil is controlled, and the incident angle of the peripheral light beam onto the image face can be prevented from being excessively increased.

More specifically, the object-side face of the third lens and the image-side face of the fifth lens include an approximate concentric shape to the aperture stop to control the generation of the coma aberration while moving the exit pupil position away from the image face by the positive refractive power of the fourth and fifth lenses.

The first lens group including the first to fifth lenses and the second lens group including the sixth lens are arranged to have a wide air space therebetween. This makes it possible to clearly separate into the role of the first lens group as the imaging group and the role of the second lens group having both of a rear convertor function and a field flattener function appropriately.

With this configuration, large aberration exchange beyond necessity is not performed between the first lens group and the second lens group. As a result, the distance between the first lens group and the second lens group can be reduced in a nonuse state to be housed in a thinned style; thus, the imaging lens is suitable for downsizing a camera.

Such a configuration makes it possible to lower the difficulty of the aberration correction, reduce the number of lenses, cut the aspheric surface and reduce the manufacturing error sensitivity compared to a case in which the distance from the most object-side face of the lens system to the image face is designed to be small and the distance from the most object-side face to the most image-side face of the lens system is designed to be small.

According to the imaging lens of this embodiment, the configuration of each portion is optimized relative to the purpose to generate new effects, so that a wide angle, large diameter, compactness, low cost and high performance can be all acquired.

The condition (1) is to control the entire length of the imaging lens, and the effect can be well obtained within the condition range.

The condition (2) is to control the entire length of the imaging lens, and the effect can be well obtained within the condition range.

By satisfying the condition (3), a high performance and compactness can be well balanced.

If the parameter exceeds the lower limit of the condition (3), the second lens group becomes too close to the first lens group. For this reason it becomes difficult to sufficiently control the field curvature because the operation as the field flattener by the second lens group is deteriorated.

If it is considered that the distance between the first lens group and the second lens group is reduced in a nonuse condition to be housed in a thinned style, the effect can not be fully obtained.

If the parameter exceeds the upper limit of the condition (3), the first lens group can not have a sufficient thickness as the imaging group, so that it becomes difficult to preferably correct various aberrations.

The condition (4) is to optimize the refractive power of the second lens group for downsizing the imaging lens. If the parameter exceeds the lower limit, the refractive power of the second lens group becomes too small. For this reason the property as the telephoto type is deteriorated, and it becomes difficult to reduce the entire length of the lens. The operation as the field flattener by the second lens group is also deteriorated, and the field curvature is not well corrected.

If the parameter exceeds the upper limit of the condition (4), the refractive power of the second lens group becomes too big, so that the field curvature is excessively corrected, and the coma aberration is generated.

The condition (5) is a condition for preferably correcting coma aberration. If the parameter exceeds the lower limit, the inward coma aberration is easily generated while if the parameter exceeds the upper limit, the outward coma aberration is easily generated. When not only the aperture stop but also a shutter is provided between the second and third lens group, if the parameter exceeds the upper limit of the condition (5), it becomes difficult to ensure the space for the shutter unit.

The condition (6) is an effective condition for optimizing the refractive power balance in the first lens group and effectively moving the exit pupil position away from the image face. If the parameter exceeds the lower limit, the refractive power on the object side from the apertures stop in the first lens group is excessively increased and the refractive power on the image side from the aperture stop is excessively decreased, so that it may not ensure a sufficient exit pupil distance.

If the parameter exceeds the upper limit of the condition (6), the refractive power on the image side from the aperture stop in the first lens group is excessively increased and the refractive power on the object side from the aperture stop is excessively decreased, so that the negative distortion is likely to be generated. The entire balance is easily deteriorated outside the range of the condition (6) regarding another aberration.

In order to more preferably correct the coma aberration and astigmatism, it is preferable to adapt on the image-side face of the fifth lens an aspheric surface in which the positive refractive power weakens in the peripheral portion. In this case by satisfying the condition (7), the preferable correction effect of the coma aberration can be obtained.

If the parameter exceeds the lower limit of the condition (7), the aspheric surface becomes too close to the aperture stop, so that it becomes difficult to obtain the correction effect of the astigmatism because the light beam of the central portion and the light beam of the peripheral portion are not well separated. If the parameter exceeds the upper limit, the aspheric surface stays away from the aperture stop. For this reason it becomes difficult to obtain the correction effect of the coma aberration because the light beam does not have a sufficient diameter.

The focusing on the close-range object is reliably achieved by moving the entire lens system. The size of the lens barrel frame to be moved is likely to be increased because the first and second lens groups are arranged via a relatively large interval. The outer diameter of the second lens group becomes larger than the outer diameter of the first lens group because the aperture stop is arranged in the first lens group. If a mechanism for integrally moving these is provided, an increase in a size of the mechanism in the diameter direction is inevitable.

The lens barrel frame to be moved is reduced in length in the optical axis direction and in diameter if the focusing on a close-range object is conducted only by the movement of the first lens group. Accordingly, the moving mechanism can be downsized.

If a mechanism which reduces the interval between the first and second lens groups for housing in a thinned style is provided, it can be commonalized with the moving mechanism.

As described above, the exchange of large aberration beyond necessity is not performed between the first lens group and the second lens group, so that the aberration change is small if the first lens group is only moved; thus, a sufficient imaging performance can be maintained.

It is preferable for the three positive lens (second, fourth and fifth lenses) of the imaging lens to satisfy the following conditions (8), (9).

$$1.75<n_{dpa}<1.95 \quad (8)$$

$$35.0<\nu_{dpa}<50.0 \quad (9)$$

Here, $n_{dpa}$ is an average value of the refractive indexes of the three positive lenses, and $\nu_{dpa}$ is an average value of Abbe's number of the three positive lenses.

By constituting the three positive lenses for imaging with a high refractive index and low dispersion material which satisfies both of the conditions (8), (9), both of the field curvature and the chromatic aberration can be reduced at high level.

It is preferable for the third and fourth lenses to be cemented to each other. In order to reduce the final aberration amount, a large exchange of the aberration is conducted in each face of the third and fourth lenses. Due to the large exchange, the manufacturing error sensitivity may be increased.

By cementing these lenses, the actual manufacturing error sensitivity is reduced, and a stable performance can be obtained. The number of components of the lens barrel for actually holding the lenses can be also reduced.

In order to preferably correct the aberration, it is preferable to provide an aspheric surface on the first lens. This is effective for correcting the spherical aberration and the coma aberration which are increased due to an increase in an aperture.

As described above, according to the embodiment of the present invention, a new imaging lens can be provided. When each of the above-conditions is satisfied, a small and high-performance imaging lens suitable for a digital camera with a wide angle in which a half-field angle is about 28-36°, a large aperture in which F-number is less than 2.8, a small number of lenses and a resolution corresponding to an imaging element having 10-20 million pixels can be provided.

Thus, a compact and high-performance camera and personal digital assistant can be offered by using the above imaging lens.

Hereinafter, embodiments will be described.

FIGS. 1-5 illustrate five embodiments of an imaging lens. These embodiments correspond to the after-described Embodiments 1-5. In FIGS. 1-5 common reference numbers are used for simplifying the figures, and I denotes a first lens group and II denotes a second lens group. L1-L6 denote first to sixth lenses, respectively, and S denotes an aperture stop. F denotes various filters and a cover glass of an imaging element as one transparent parallel plate which is optically equivalent to those.

As illustrated in FIGS. 1-5, each of the imaging lenses of these embodiments includes in order from the object side (left side in figure) the first lens group I having a positive refractive power and the second lens group II having a negative refractive power. The first and second lens groups include therebetween the widest air space in the lens system.

The first lens group I includes in order from the object side a negative first lens L1 having a concave face on the object side, a positive second lens L2 having a convex face on both sides, an aperture stop S, a negative third lens L3 having a concave face on the object side, a positive fourth lens L4 having a convex face on the image side and a positive fifth lens L5 having a convex face on the image side.

The second lens group II includes a negative meniscus sixth lens L6 having a concave face on the object side. The third and fourth lenses L3, L4 are cemented in any of the embodiments illustrated in FIGS. 1-5.

The image-side face of the fifth lens L5 is an aspheric surface shape in which a positive refractive power weakens in the peripheral portion.

In any of the embodiments in FIGS. 1-5, the first lens L1 is a biconcave lens and the second lens L2 is a biconvex lens. The third lens L3 is a biconcave lens having a large absolute value of curvature on the object-side face. In the embodiment illustrated in FIG. 5 the third lens L3 is a negative meniscus lens having a large absolute value of curvature on the object-side face.

The fourth lens L4 is a biconvex lens having a large absolute value of curvature on the image-side face in the embodiments illustrated in FIGS. 1-4. The fourth lens L4 includes a positive meniscus lens having a large absolute value of curvature on the image-side face.

Figure 2:
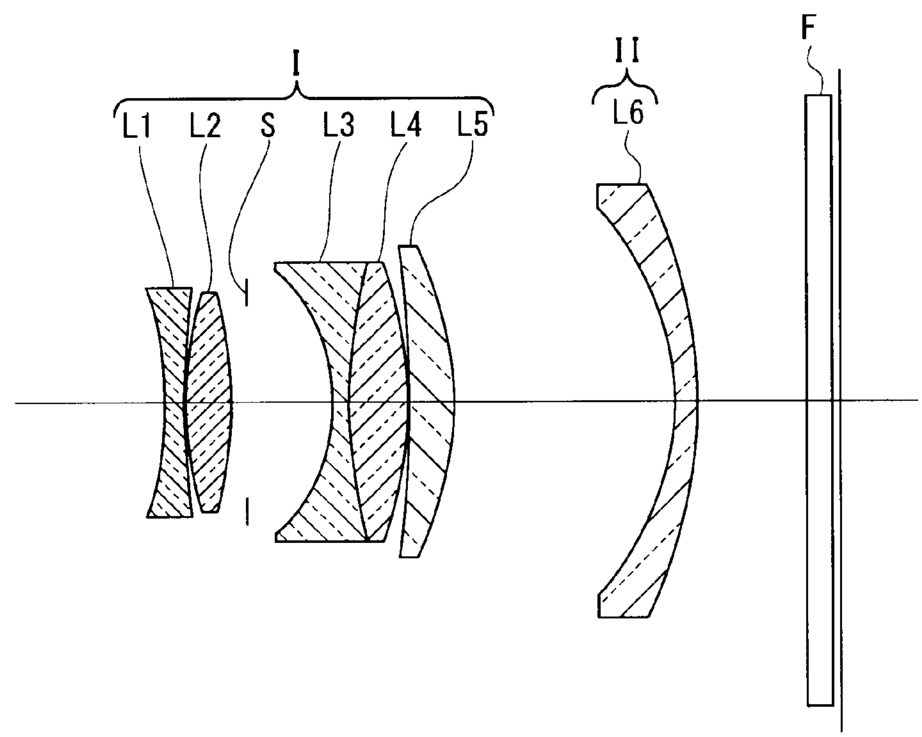
FIG. 2 is a view illustrating a configuration of an imaging lens according to Embodiment 2.
Figure 3:
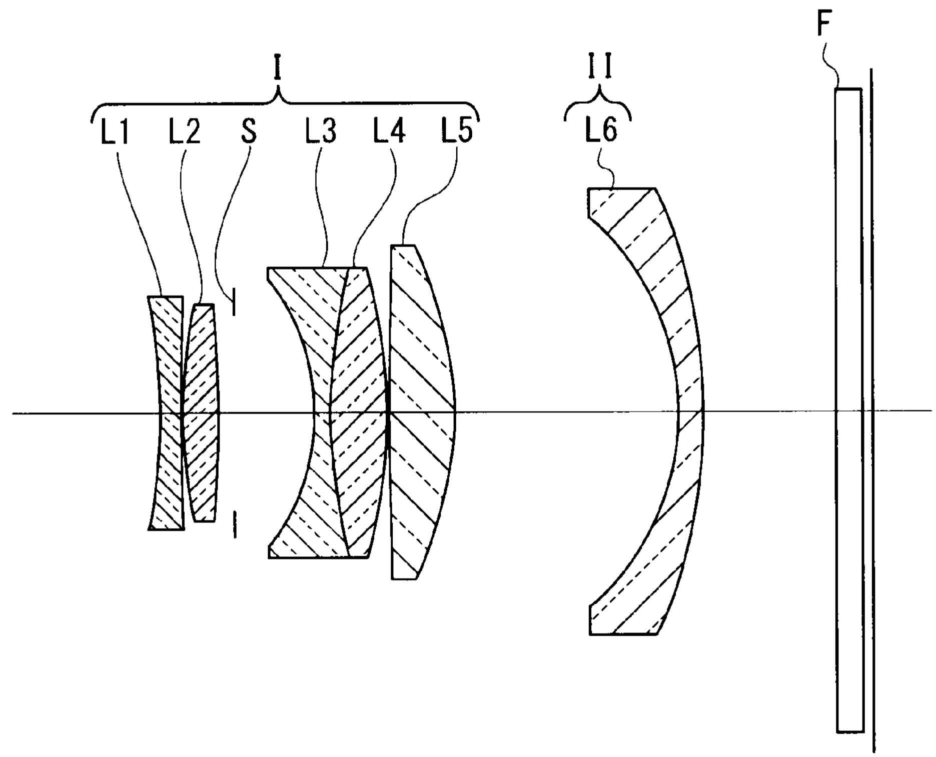
FIG. 3 is a view illustrating a configuration of an imaging lens according to Embodiment 3.
Figure 4:
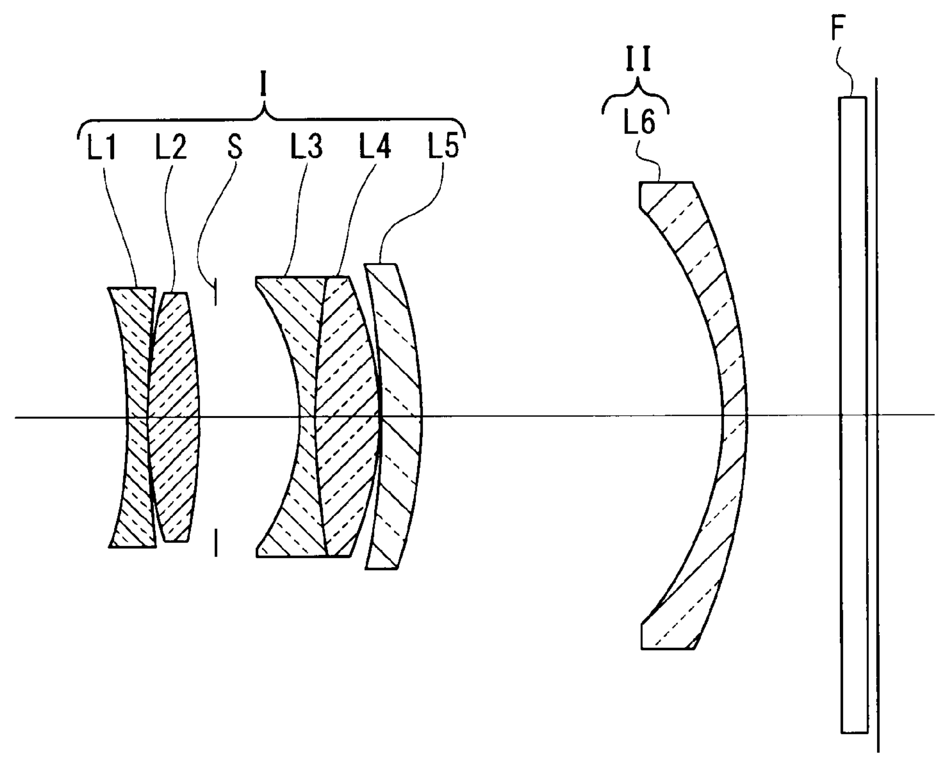
FIG. 4 is a view illustrating a configuration of an imaging lens according to Embodiment 4.
Figure 5:
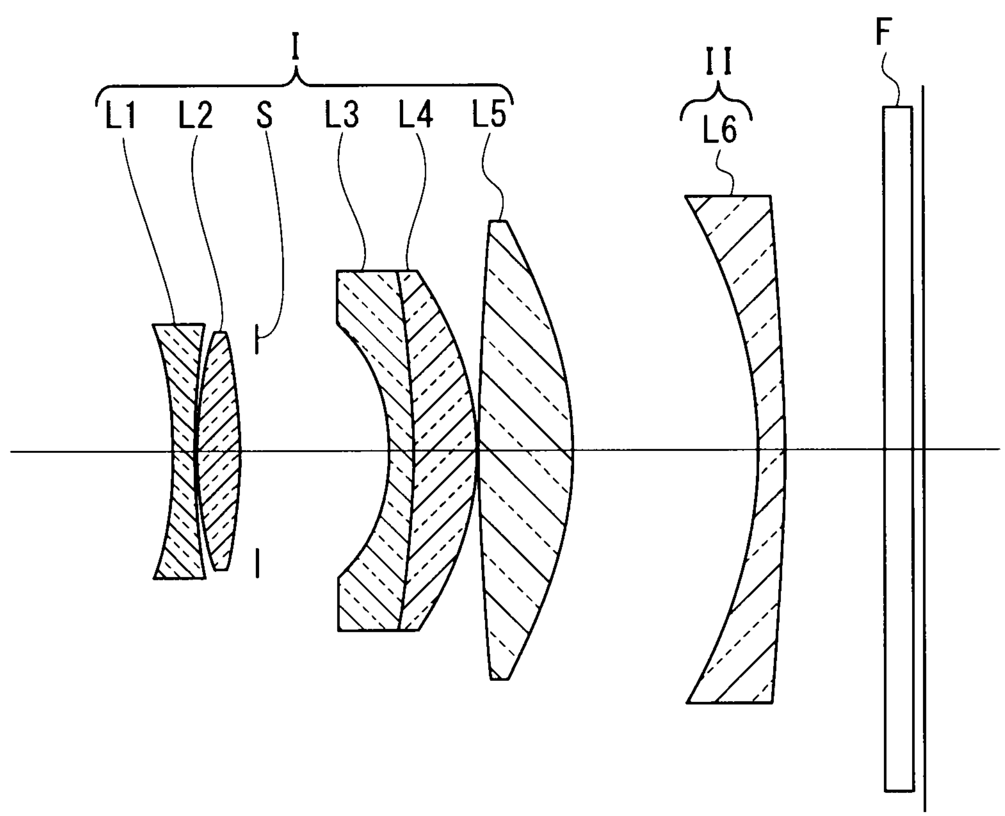
FIG. 5 is a view illustrating a configuration of an imaging lens according to Embodiment 5.

The fifth lens L5 is a positive meniscus lens having a large absolute value of curvature on the image-side face in the embodiments illustrated in FIGS. 1, 2, 4. The fifth lens L5 is a biconvex lens having a large absolute value of curvature on the image-side face in the embodiments illustrated in FIGS. 3, 5.

As illustrated in Embodiments 1-5, the imaging lens illustrated in each of FIGS. 1-5 satisfies the conditions (1)-(7), and the material of the third to fifth lenses L3-L5 satisfies the conditions (8), (9).

The embodiment of the personal digital assistant is described with reference to FIGS. 16, 17.

Figure 17:
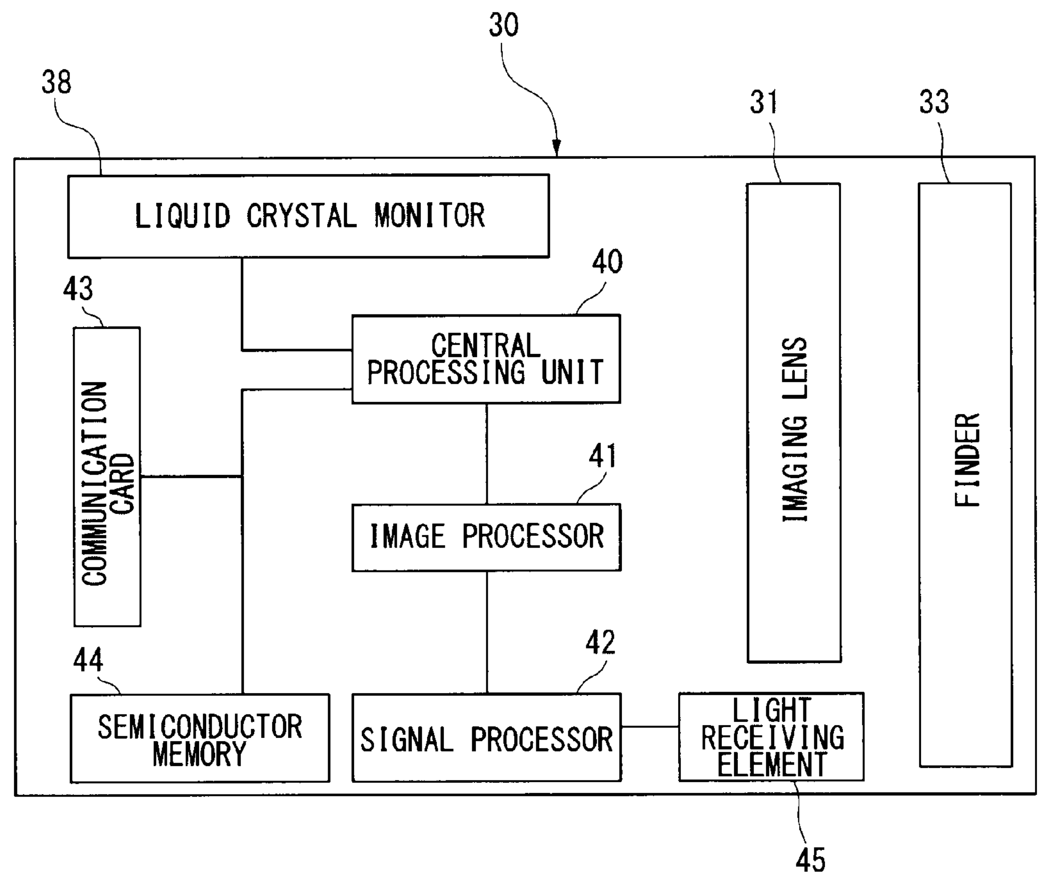
FIG. 17 is a view describing a system of the personal digital assistant in FIG. 16.

The personal digital assistant includes an imaging lens 31, a light-receiving element (area sensor) 45 as illustrated in FIG. 17, and is configured to read an image of a photographing object formed by the imaging lens 31 with the light-receiving element 45. The imaging lens described above can be used as the imaging lens 31, but the imaging lens described in any of Embodiments 1-5 can be specifically used.

A relatively large imaging element having a diagonal length of about 20-45 mm which allows a certain level of oblique incidence of the peripheral light beam onto the imaging face is used.

The output from the light-receiving element 45 is processed in an image processor 41 which is controlled by a central processing unit 40 to be converted into digital information. The digitized image information is subjected to a predetermined image process in the image processor 41 which is controlled by the central processing unit 40, and then is recorded in a semiconductor memory 44.

An image in photographing can be displayed on a liquid crystal monitor 38, and an image recorded in the semiconductor memory 44 can be also displayed on the liquid crystal monitor 38.

An image recorded in the semiconductor memory 44 can be sent outside with a communication card 43 or the like.

Figure 16A:
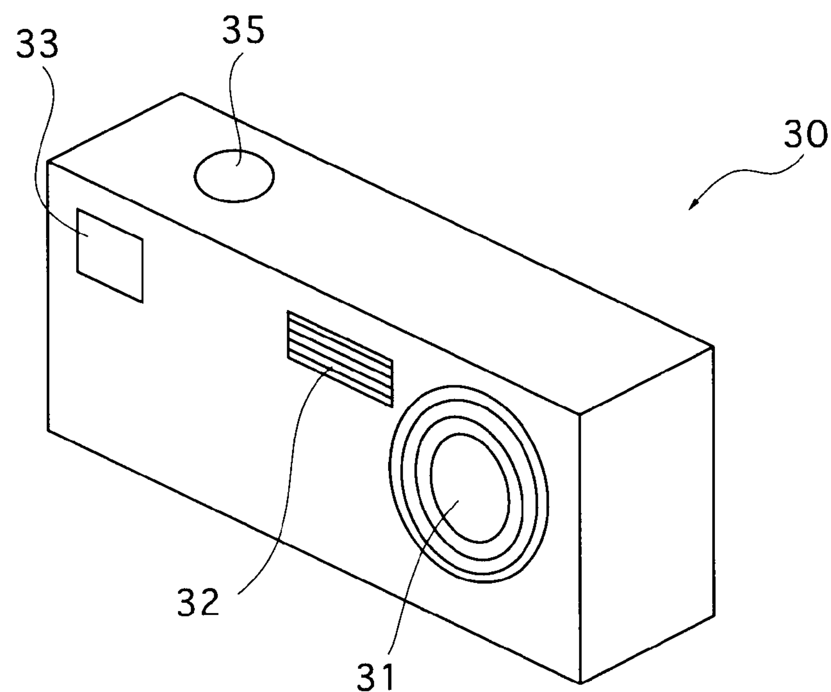
FIGS. 16A-C are views describing a first embodiment of a personal digital assistant.
Figure 16B:
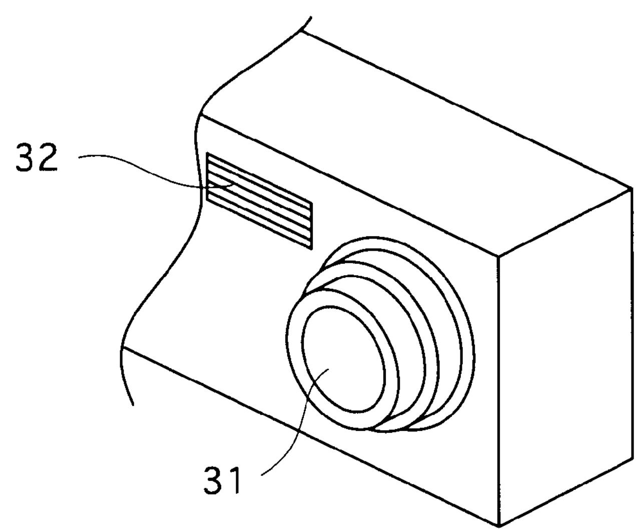
Figure 16C:
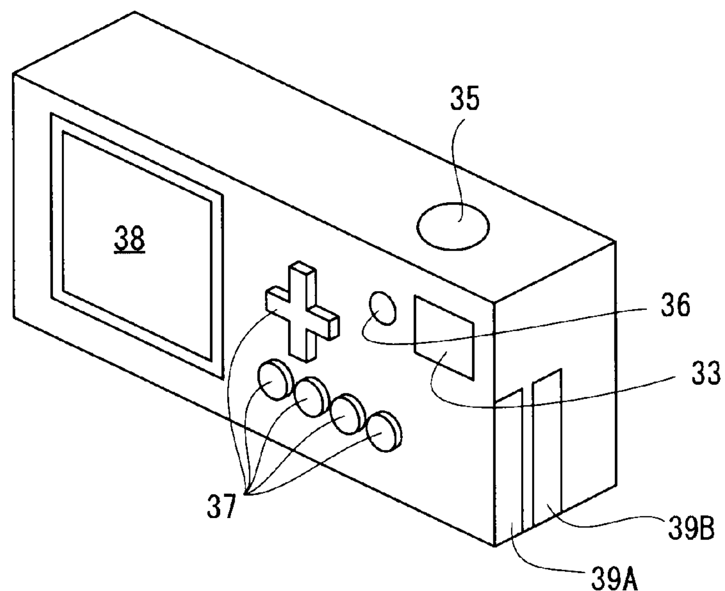

The imaging lens 31 is in a collapsed state as illustrated in FIG. 16A, and a lens barrel is extended as illustrated in FIG. 16B if a user presses a power source switch 36 to turn on the device.

Focusing is made upon half-pressing a shutter button 35. In addition, a zoom lever is provided, and a so-called digital zooming operation which artificially changes a magnification according to a change in a cut area of an image can be performed in response to the operation of the zoom lever. Here, a magnification of a finder 33 is changed together with a change in a field angle.

The focusing can be performed with the movement of the entire lens system or can be performed with the movement of the light-receiving element 45. The focusing can be also performed with the movement of the first lens group only as the imaging lens described above.

Upon further pressing the shutter button 35, the photographing is performed, and then the above process is conducted. The image recorded in the semiconductor memory 44 is displayed on the liquid crystal monitor 38, and the operation button 37 is used when sending the image outside with a communication card 43 or the like. The semiconductor memory 44, the communication card 43 or the like is inserted into dedicated or generalized sockets 39A, 39B. A device except for the communication operation with outside is a camera, and this camera is a camera portion of the personal digital assistant.

It is not necessary for each lens group to be arranged on the optical axis while the imaging lens 31 is in the collapsed state. The thickness of the device can be further reduced if the third to fifth lenses L3-L5 or the second lens group are/is retracted from the optical axis to be housed in parallel with other lenses.

As described above, the use of the imaging lens of Embodiments 1-5 in the personal digital assistant makes possible a high image quality and compact camera and personal digital assistant using a light-receiving element having 10-20 million pixels (a relatively large imaging element having a diagonal length of about 20-45 mm, which allows a certain level of oblique incidence of a peripheral light beam onto the imaging face).

Embodiment

Hereinafter, five specific embodiments of the imaging lens will be described.

In Embodiments 1-4 the maximum image height is 14.2 mm and in Embodiment 5 the maximum image height is 13.5 mm. In Embodiments 1-5 the parallel plate arranged on the image face side of the second lens group is various filters such as an optical low pass filter or an infrared cut filter, or a cover glass (sealing glass) of the light-receiving element such as a CMOS sensor.

In addition, the parallel plate is arranged such that its image side face is located on the object side from the imaging face by about 0.5 mm, but it is not limited thereto, and it can be divided into a plurality of plates.

The meanings of signs in each Embodiment are as follows.

f: focal length of entire optical system
Fno: F-number
ω: half-field angle
R: curvature radius
D: surface interval
$N_d$: refractive index
$\nu_d$: Abbe's number
$P_{g,F}$: partial dispersion ratio $P_{g,F}=(n_g-n_F)/(n_F-n_c)$
K: conical constant of aspheric surface
$A_4$: $4^{th}$ aspheric coefficient
$A_6$: $6^{th}$ aspheric coefficient
$A_8$: $8^{th}$ aspheric coefficient
$A_{10}$: $10^{th}$ aspheric coefficient An aspheric surface X is defined by the following known equation with an inverse C (paraxial curvature) of paraxial curvature radius, a height H from the optical axis, the above conical constants and aspheric coefficients.

$$X=CH^2/[1+\sqrt{(1-(1+K)C^2H^2)}]+A_4{\cdot}H^4+A_6{\cdot}H^6+A_8{\cdot}H^8+A_{10}{\cdot}H^{10}$$

In each embodiment HOYA in the glass type means HOYA Corporation, OHARA in the glass type means OHARA Corporation, and HIKARI in the glass type means HIKARI Glass Corporation.

[Embodiment 1]

f = 22.99, F = 2.55, ω = 32.4

| SURFACE NUMBER | R | D | $N_d$ | $\nu_d$ | $P_{g,F}$ | GLASS TYPE |
|---|---|---|---|---|---|---|
| 01* | −19.075 | 1.00 | 1.68893 | 31.08 | 0.5986 | OHARA L-TIM28 |
| 02 | 47.506 | 0.10 | | | | |
| 03 | 18.926 | 2.16 | 1.88300 | 40.76 | 0.5667 | OHARA S-LAH58 |
| 04 | −23.061 | 0.80 | | | | |
| 05 | APERTURE STOP | 4.79 | | | | |

-continued

| [Embodiment 1] | | | | | | |
|---|---|---|---|---|---|---|
| 06 | −8.544 | 0.82 | 1.69895 | 30.13 | 0.6030 | OHARA S-TIM35 |
| 07 | 28.214 | 2.56 | 1.83481 | 42.71 | 0.5648 | OHARA S-LAH55V |
| 08 | −20.938 | 0.10 | | | | |
| 09 | −138.070 | 2.76 | 1.74320 | 49.29 | 0.5529 | OHARA L-LAM60 |
| 10* | −12.915 | 8.72 | | | | |
| 11 | −11.296 | 1.20 | 1.51742 | 52.43 | 0.5564 | OHARA S-NSL36 |
| 12 | −22.532 | VARIABLE (A) | | | | |
| 13 | ∞ | 1.30 | 1.51680 | 64.20 | VARIOUS FILTER | |
| 14 | ∞ | | | | | |

[Aspheric Surface]

In the above table a surface number with * (asterisk) denotes an aspheric surface. This is the same in Embodiments 2-5.
The aspheric surface data of Embodiment 1 is as follows.

First Surface $K = 0.0$, $A_4 = -5.83484 \times 10^{-5}$, $A_6 = -2.17156 \times 10^{-7}$, $A_8 = 5.68288 \times 10^{-9}$, $A_{10} = -1.59389 \times 10^{-10}$ Tenth Surface $K = 0.0$, $A_4 = 5.68159 \times 10^{-5}$, $A_6 = 2.68561 \times 10^{-7}$, $A_8 = -3.11147 \times 10^{-10}$, $A_{10} = 2.28609 \times 10^{-11}$

[Variable Interval]

The variable interval A is an interval change between the first and second lens groups due the displacement of the first lens group in focusing from an infinite object to a close-range object (magnification of −1/20).

| | Infinity | −1/20 times |
|---|---|---|
| A | 7.379 | 8.528 |

[Value of Parameter of Condition]

| | |
|---|---|
| [1] | $L/f = 1.49$ |
| [2] | $Y'/f = 0.617$ |
| [3] | $D_{1G-2G}/L = 0.255$ |
| [4] | $f_{2G}/f = -1.98$ |
| [5] | $R_{L3F}/D_{L2-L3} = -1.53$ |
| [6] | $f_{L1-L2}/f = 1.20$ |
| [7] | $L_{S-A}/L_{S-I} = 0.366$ |
| [8] | $n_{dpa} = 1.820$ |
| [9] | $\nu_{dpa} = 44.3$ |

[Embodiment 2]

$f = 22.99$, $F = 2.56$, $\omega = 32.5$

| SURFACE NUMBER | R | D | $N_d$ | $\nu_d$ | $P_{g,F}$ | GLASS TYPE |
|---|---|---|---|---|---|---|
| 01* | −19.042 | 1.00 | 1.68893 | 31.16 | 0.6037 | HOYA M-FD80 |
| 02 | 32.587 | 0.10 | | | | |
| 03 | 17.848 | 2.33 | 1.88300 | 40.80 | 0.5654 | HOYA TAFD30 |
| 04 | −21.421 | 0.80 | | | | |
| 05 | APERTURE STOP | 4.39 | | | | |
| 06 | −8.787 | 0.80 | 1.68893 | 31.16 | 0.5989 | HOYA E-FD8 |
| 07 | 24.308 | 3.01 | 1.83481 | 42.72 | 0.5653 | HOYA TAFD5F |
| 08 | −19.079 | 0.10 | | | | |
| 09 | −59.475 | 2.36 | 1.77387 | 47.25 | 0.5557 | HIKARI Q-LASFH11 |
| 10* | −14.339 | VARIABLE (A) | | | | |
| 11 | −13.524 | 1.20 | 1.67270 | 32.17 | 0.5962 | HOYA E-FD5 |
| 12 | −22.904 | 5.619 | | | | |

-continued

| [Embodiment 2] | | | | | |
|---|---|---|---|---|---|
| 13 | ∞ | 1.30 | 1.51680 | 64.20 | VARIOUS FILTER |
| 14 | ∞ | | | | |

[Aspheric Surface]

The aspheric surface data of Embodiment 2 is as follows.

First Surface $K = 0.0$, $A_4 = -6.48729 \times 10^{-5}$, $A_6 = -3.64206 \times 10^{-7}$, $A_8 = 9.41909 \times 10^{-9}$, $A_{10} = -2.27481 \times 10^{-10}$ Tenth Surface $K = 0.0$, $A_4 = 5.05271 \times 10^{-5}$, $A_6 = 3.24752 \times 10^{-7}$, $A_8 = -1.48743 \times 10^{-09}$, $A_{10} = 3.86782 \times 10^{-11}$

[Variable Interval]

| | Infinity | −1/20 times |
|---|---|---|
| A | 11.290 | 12.129 |

[Numerical Value of Parameter of Condition]

| | |
|---|---|
| [1] | $L/f = 1.51$ |
| [2] | $Y'/f = 0.617$ |
| [3] | $D_{1G-2G}/L = 0.324$ |
| [4] | $f_{2G}/f = -2.25$ |
| [5] | $R_{L3F}/D_{L2-L3} = -1.69$ |
| [6] | $f_{L1-L2}/f = 1.22$ |
| [7] | $L_{S-A}/L_{S-I} = 0.349$ |
| [8] | $n_{dpa} = 1.831$ |
| [9] | $\nu_{dpa} = 43.4$ |

[Embodiment 3]

$f = 22.99$, $F = 2.55$, $\omega = 32.7$

| SURFACE NUMBER | R | D | $N_d$ | $\nu_d$ | $P_{g,F}$ | GLASS TYPE |
|---|---|---|---|---|---|---|
| 01 | −23.416 | 1.00 | 1.54814 | 45.78 | 0.5686 | OHARA S-TIL1 |
| 02 | 128.083 | 0.10 | | | | |
| 03 | 23.801 | 1.74 | 1.88300 | 40.76 | 0.5667 | OHARA S-LAH58 |
| 04 | −44.679 | 0.80 | | | | |
| 05 | APERTURE STOP | 3.81 | | | | |
| 06 | −9.949 | 0.80 | 1.80518 | 25.42 | 0.6161 | OHARA S-TIH6 |
| 07 | 26.658 | 2.78 | 1.88300 | 40.76 | 0.5667 | OHARA S-LAH58 |
| 08 | −24.229 | 0.10 | | | | |
| 09 | 270.532 | 3.23 | 1.85400 | 40.39 | 0.5677 | OHARA L-LAH85 |
| 10* | −15.271 | VARIABLE (A) | | | | |
| 11 | −11.494 | 1.20 | 1.48749 | 70.24 | 0.5300 | OHARA S-FSL5 |
| 12 | −24.356 | 6.474 | | | | |
| 13 | ∞ | 1.30 | 1.51680 | 64.20 | VARIOUS FILTER | |
| 14 | ∞ | | | | | |

[Aspheric Surface]

The aspheric surface data of Embodiment 3 is as follows.

[Tenth Surface]

$K = 0.0$, $A_4 = 4.68271 \times 10^{-5}$, $A_6 = -7.49722 \times 10^{-8}$, $A_8 = 3.11817 \times 10^{-09}$, $A_{10} = -1.79903 \times 10^{-11}$

[Variable Interval]

| | Infinity | −1/20 times |
|---|---|---|
| A | 10.990 | 11.783 |

-continued

| [Embodiment 3] | |
|---|---|
| [Value of Parameter of Condition] | |
| [1] | $L/f = 1.51$ |
| [2] | $Y'/f = 0.618$ |
| [3] | $D_{1G-2G}/L = 0.316$ |
| [4] | $f_{2G}/f = -2.00$ |
| [5] | $R_{L3F}/D_{L2-L3} = -2.16$ |
| [6] | $f_{L1-L2}/f = 1.45$ |
| [7] | $L_{S-A}/L_{S-I} = 0.344$ |
| [8] | $n_{dpa} = 1.873$ |
| [9] | $\nu_{dpa} = 40.6$ |

[Embodiment 4]

f = 26.10, F = 2.55, ω = 28.4

| SURFACE NUMBER | R | D | $N_d$ | $\nu_d$ | $P_{g,F}$ | GLASS TYPE |
|---|---|---|---|---|---|---|
| 01* | −23.106 | 1.00 | 1.68893 | 31.16 | 0.6037 | HOYA M-FD80 |
| 02 | 38.954 | 0.10 | | | | |
| 03 | 19.400 | 2.49 | 1.88300 | 40.80 | 0.5654 | HOYA TAFD30 |
| 04 | −25.409 | 0.80 | | | | |
| 05 | APERTURE STOP | 4.02 | | | | |
| 06 | −10.106 | 0.80 | 1.69895 | 30.05 | 0.6028 | HOYA E-FD15 |
| 07 | 40.833 | 3.15 | 1.83481 | 42.72 | 0.5653 | HOYA TAFD5F |
| 08 | −14.427 | 0.10 | | | | |
| 09 | −30.482 | 2.00 | 1.74330 | 49.33 | 0.5527 | HOYA M-NBF1 |
| 10* | −18.907 | VARIABLE (A) | | | | |
| 11 | −13.992 | 1.20 | 1.58144 | 40.89 | 0.5767 | HOYA E-FL5 |
| 12 | −24.992 | 4.603 | | | | |
| 13 | ∞ | 1.30 | 1.51680 | 64.20 | VARIOUS FILTER | |
| 14 | ∞ | | | | | |

[Aspheric Surface]

The aspheric surface data of Embodiment 4 is as follows.

First Surface $K = 0.0, A_4 = -5.18356 \times 10^{-5}, A_6 = -7.05306 \times 10^{-8}$ Tenth Surface $K = 0.0, A_4 = 3.82341 \times 10^{-5}, A_6 = 2.11800 \times 10^{-7}, A_8 = -1.03464 \times 10^{-09}, A_{10} = 3.68428 \times 10^{-11}$

[Variable Interval]

| | Infinity | −1/20 times |
|---|---|---|
| A | 14.760 | 15.771 |

| [Value of Parameter of Condition] | |
|---|---|
| [1] | $L/f = 1.41$ |
| [2] | $Y'/f = 0.544$ |
| [3] | $D_{1G-2G}/L = 0.401$ |
| [4] | $f_{2G}/f = -2.18$ |
| [5] | $R_{L3F}/D_{L2-L3} = -2.10$ |
| [6] | $f_{L1-L2}/f = 1.12$ |
| [7] | $L_{S-A}/L_{S-I} = 0.310$ |
| [8] | $n_{dpa} = 1.820$ |
| [9] | $\nu_{dpa} = 44.3$ |

| [Embodiment 5] | | | | | | |
|---|---|---|---|---|---|---|
| f = 20.01, F = 2.43, ω = 35.3 | | | | | | |
| SURFACE NUMBER | R | D | $N_d$ | $\nu_d$ | $P_{g,F}$ | GLASS TYPE |
| 01* | −19.041 | 1.00 | 1.68893 | 31.16 | 0.6037 | HOYA M-F080 |
| 02 | 35.375 | 0.10 | | | | |
| 03 | 18.449 | 1.99 | 1.88300 | 40.80 | 0.5654 | HOYA TAFD30 |
| 04 | −21.673 | 0.80 | | | | |
| 05 | APERTURE STOP | 6.17 | | | | |
| 06 | −7.627 | 1.08 | 1.84666 | 23.78 | 0.6191 | HOYA FDS90 |
| 07 | −40.431 | 2.88 | 1.83481 | 42.72 | 0.5653 | HOYA TAFD5F |
| 08 | −12.603 | 0.10 | | | | |
| 09 | 84.682 | 4.43 | 1.80610 | 40.73 | 0.5693 | HOYA M-NBFD130 |
| 10* | −15.269 | VARIABLE (A) | | | | |
| 11 | −19.987 | 1.20 | 1.84666 | 23.78 | 0.6191 | HOYA FDS90 |
| 12 | −104.398 | 4.672 | | | | |
| 13 | ∞ | 1.30 | 1.51680 | 64.20 | VARIOUS FILTER | |
| 14 | ∞ | | | | | |

[Aspheric Surface]

The aspheric surface data of Embodiment 5 is as follows.

First Surface $K = 0.0, A_4 = -6.73538 \times 10^{-5}, A_6 = -3.07899 \times 10^{-7}, A_8 = -1.81784 \times 10^{-9}, A_{10} = 6.98371 \times 10^{-11}$ Tenth Surface $K = 0.0, A_4 = 5.50839 \times 10^{-5}, A_6 = 8.64191 \times 10^{-8}, A_8 = 3.64358 \times 10^{-10}, A_{10} = 6.27272 \times 10^{-13}$

| [Variable Interval] | | |
|---|---|---|
| | Infinity | −1/20 times |
| A | 8.580 | 9.238 |

| [Value of Parameter of Condition] | |
|---|---|
| [1] | $L/f = 1.74$ |
| [2] | $Y'/f = 0.675$ |
| [3] | $D_{1G-2G}/L = 0.247$ |
| [4] | $f_{2G}/f = -1.46$ |
| [5] | $R_{L3F}/D_{L2-L3} = -1.09$ |
| [6] | $f_{L1-L2}/f = 1.42$ |
| [7] | $L_{S-A}/L_{S-I} = 0.474$ |
| [8] | $n_{dpa} = 1.841$ |
| [9] | $\nu_{dpa} = 41.4$ |

Figure 6:
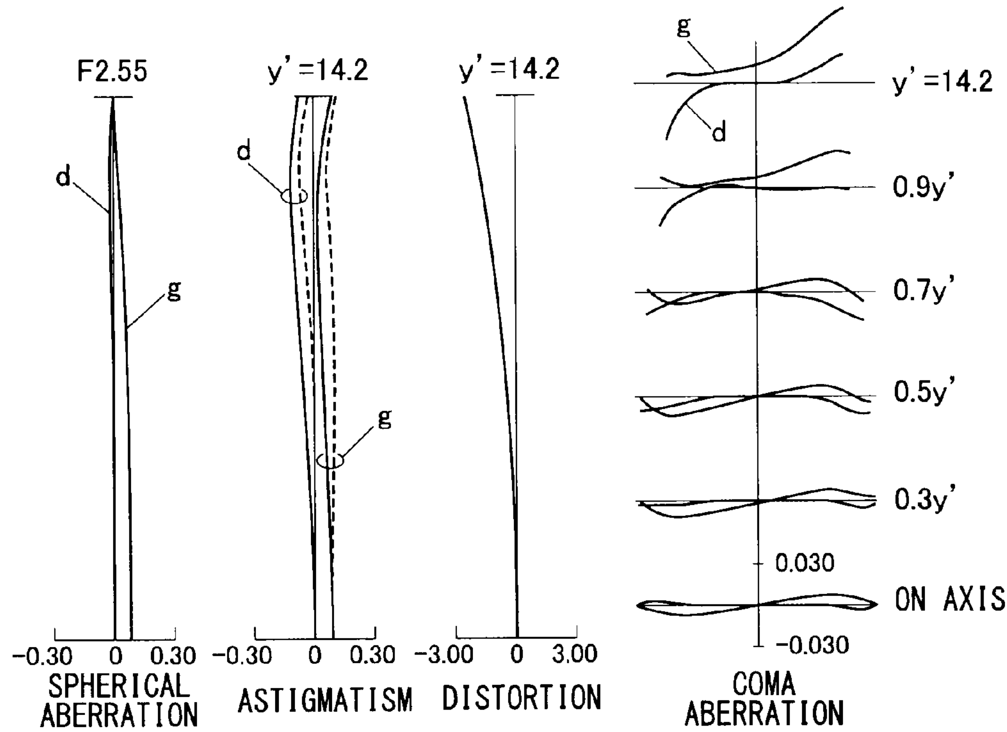
FIG. 6 provides aberration curves when the imaging lens in Embodiment 1 is focused on an infinite object.
Figure 7:
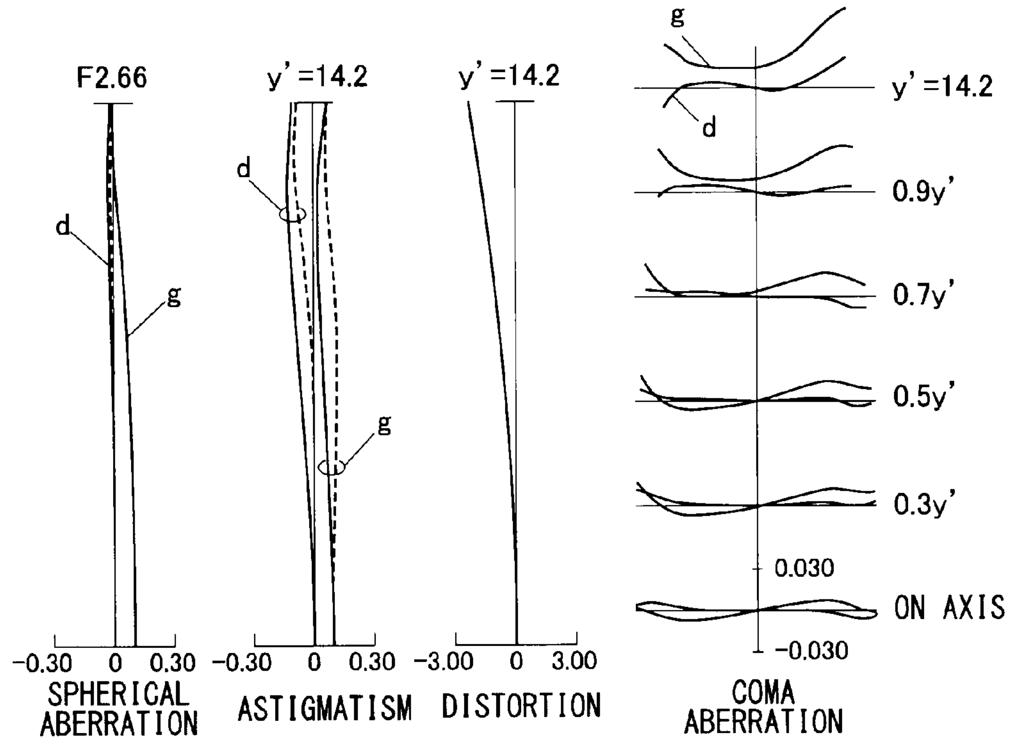
FIG. 7 provides aberration curves when the imaging lens in Embodiment 1 is focused on a close-range object by −1/20 times.

FIG. 6 provides aberration curves when the imaging lens in Embodiment 1 is focused on an infinite object. FIG. 7 provides aberration curves when the imaging lens in Embodiment 1 is focused on a close-range object by −/20 times.

Figure 8:
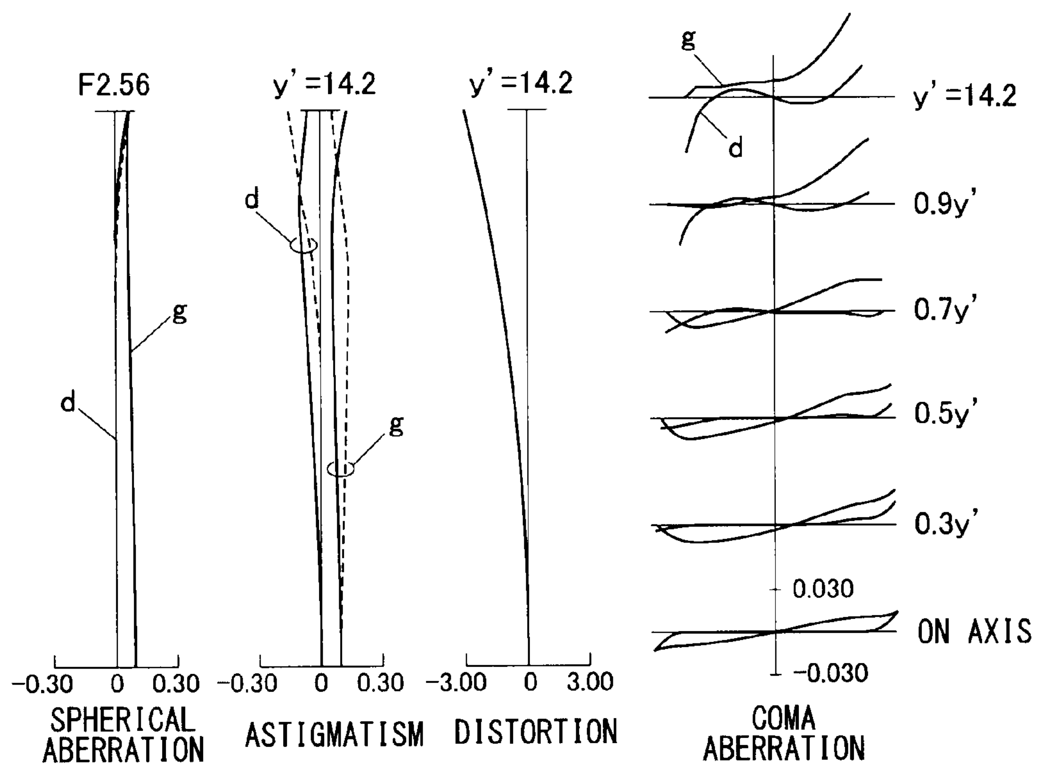
FIG. 8 provides aberration curves when the imaging lens of Embodiment 2 is focused on an infinite object.
Figure 9:
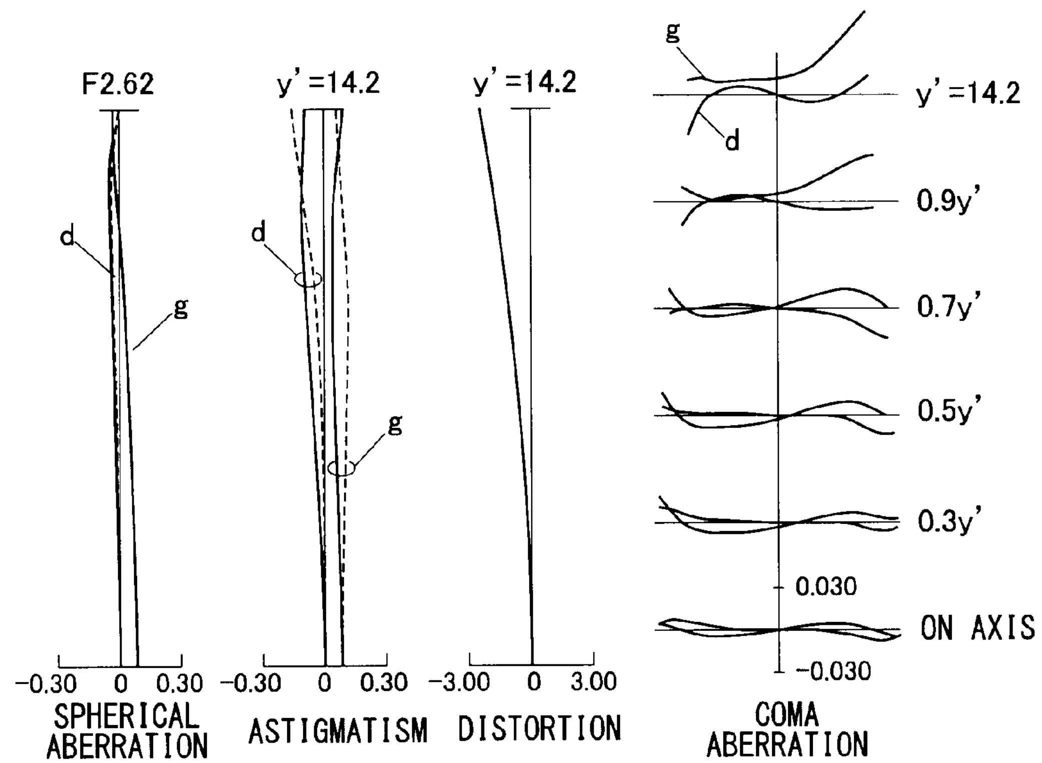
FIG. 9 provides aberration curves when the imaging lens of Embodiment 2 is focused on a close-range object by −1/20 times.

FIG. 8 provides aberration curves when the imaging lens of Embodiment 2 is focused on an infinite object. FIG. 9 provides aberration curves when the imaging lens of Embodiment 2 is focused on a close-range object by −1/20 times.

Figure 10:
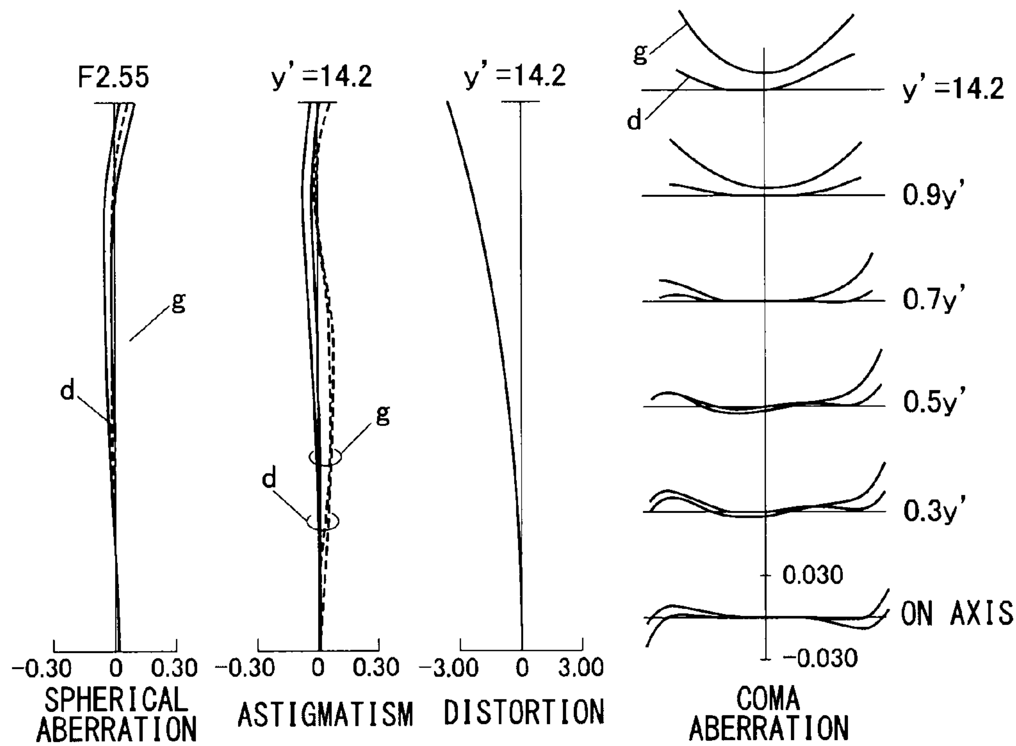
FIG. 10 provides aberration curves when the imaging lens of Embodiment 3 is focused on an infinite object.
Figure 11:
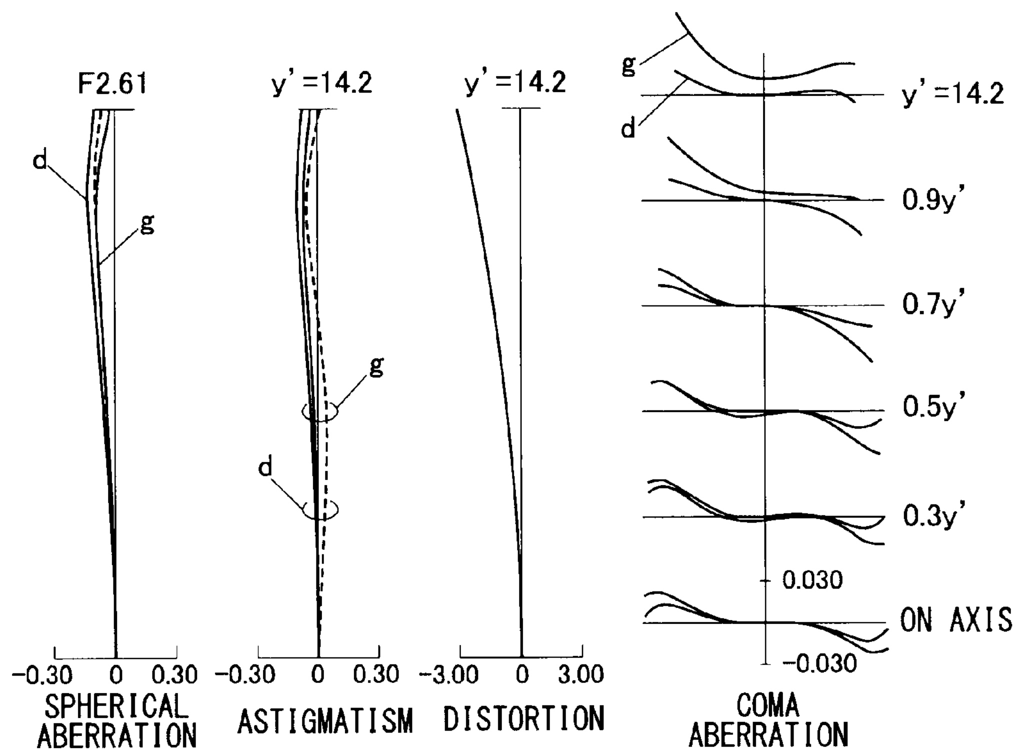
FIG. 11 provides aberration curves when the imaging lens of Embodiment 3 is focused on a close-range object by −1/20 times.

FIG. 10 provides aberration curves when the imaging lens of Embodiment 3 is focused on an infinite object. FIG. 11 provides aberration curves when the imaging lens of Embodiment 3 is focused on a close-range object by −1/20 times.

Figure 12:
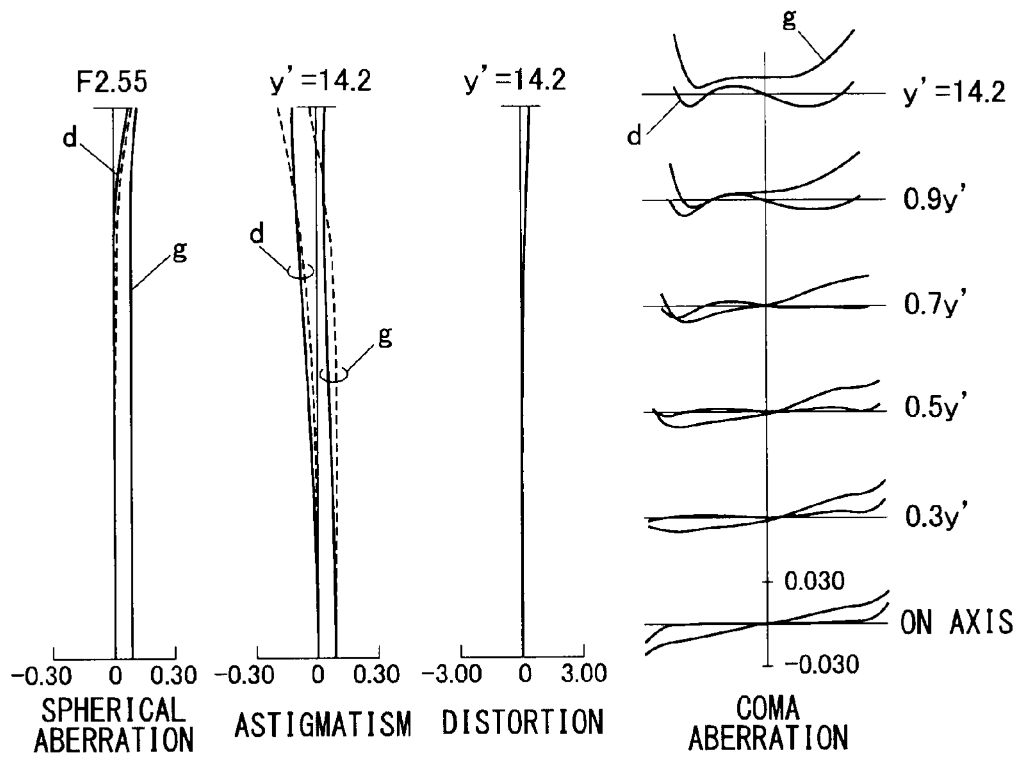
FIG. 12 provides aberration curves when the imaging lens of Embodiment 4 is focused on an infinite object.
Figure 13:
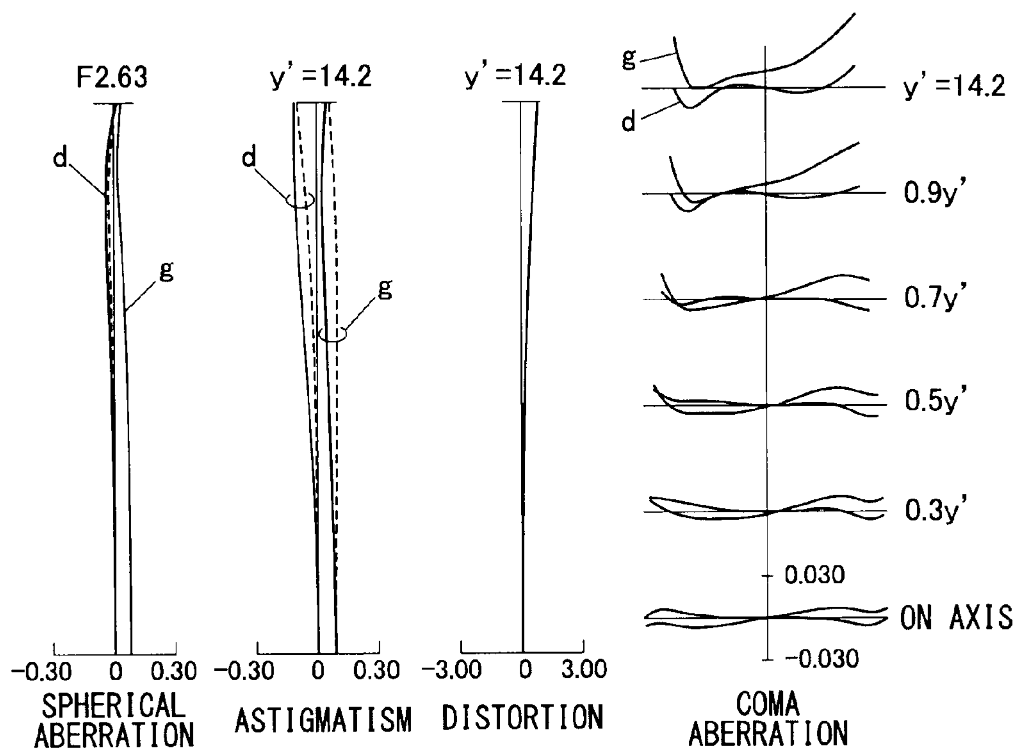
FIG. 13 provides aberration curves when the imaging lens of Embodiment 4 is focused on a close-range object by −1/20 times.

FIG. 12 provides aberration curves when the imaging lens of Embodiment 4 is focused on an infinite object. FIG. 13 provides aberration curves when the imaging lens of Embodiment 4 is focused on a close-range object by −1/20 times.

Figure 14:
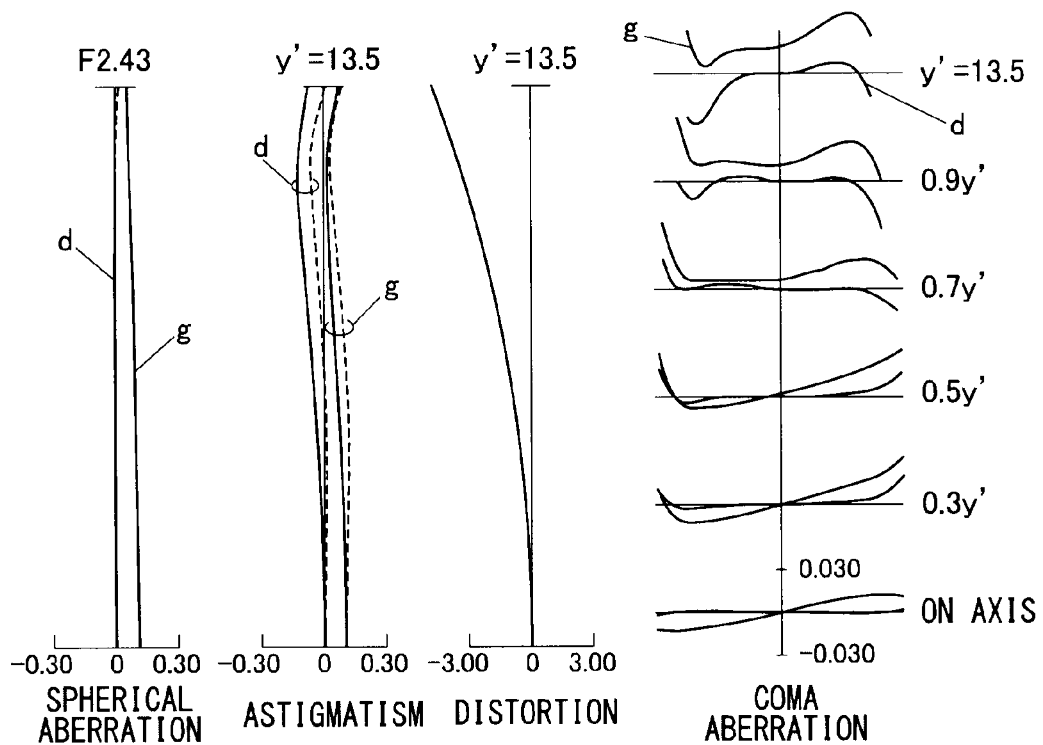
FIG. 14 provides aberration curves when the imaging lens of Embodiment 5 is focused on an infinite object.
Figure 15:
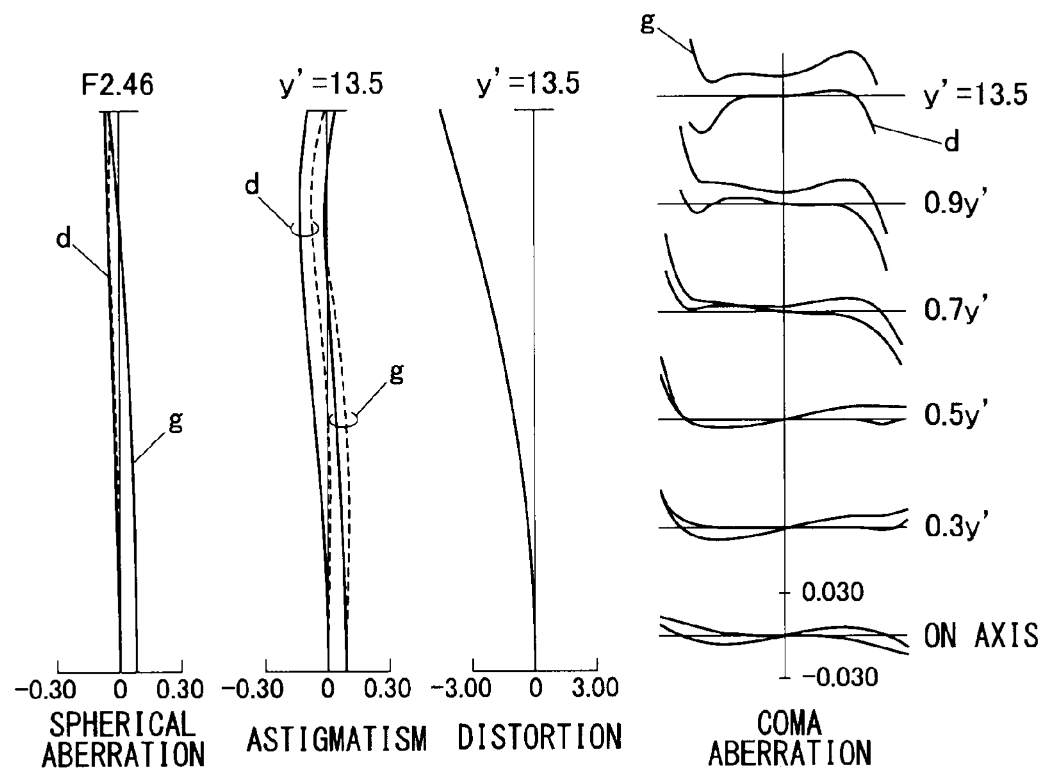
FIG. 15 provides aberration curves when the imaging lens of Embodiment 5 is focused on a close-range object by −1/20 times.

FIG. 14 provides aberration curves when the imaging lens of Embodiment 5 is focused on an infinite object. FIG. 15 provides aberration curves when the imaging lens of Embodiment 5 is focused on a close-range object by −1/20 times.

In each aberration curve the dashed line in the spherical aberration illustrates a sine condition, and the solid line and the dashed line in the astigmatism illustrate sagittal and meridional, respectively.

The aberration of each embodiment is corrected at a high level, and the spherical aberration and the axial chromatic aberration are very small. The astigmatism, the field curvature and the chromatic aberration of magnification are small enough, the coma aberration and the color difference are effectively controlled, and the distortion is 4.0% or below at an absolute value.

As described above, it is apparent from the above embodiments that the imaging lens includes a wide angle having a half-field angle of about 28-36°, a large aperture having an F-number of less than 2.8 while ensuring a preferable image performance.

Although the embodiments of the present invention have been described above, the present invention is not limited thereto. It should be appreciated that variations may be made in the embodiments described by persons skilled in the art without departing from the scope of the present invention.

What is claimed is:

1. An imaging lens, comprising: in order from an object side a first lens group including a positive refractive power; and a second lens group having a negative refractive power, the first lens group and the second lens group including a widest air space therebetween, the first lens group including in order from the object side a negative first lens having a concave face on the object side, a positive second lens having a convex face on both sides, an aperture stop, a negative third lens having a concave face on the object side, a positive fourth lens having a convex face on an image side and a positive fifth lens having a convex face on the image side, and the second lens group including a negative meniscus sixth lens having a concave face on the object side.

2. The imaging lens according to claim 1, wherein a distance L from a most object-side face of the first lens group to an image face in a state focused on an infinite object and a focal length f of an entire system in a state focused on an infinite object satisfy the following condition (1):

$$1.2<L/f<2.0 \quad (1).$$

3. The imaging lens according to claim 2, wherein the focal length f of the entire system in a state focused on an infinite object and a maximum image height Y' satisfy the following condition (2):

$$0.50<Y'/f<0.70 \quad (2).$$

4. The imaging lens according to claim 1, wherein a distance L from a most object-side face of the first lens group to an image face in a state focused on an infinite object and a distance $D_{1G\text{-}2G}$ from a most image-side face of the first lens group to a most object-side face of the second lens group in a state focused on an infinite object satisfy the following condition (3):

$$0.15<D_{1G\text{-}2G}/L<0.50 \quad (3).$$

5. The imaging lens according to claim 1, wherein a focal length of the second lens group $f_{2G}$ and a focal length f of an entire system in a state focused on an infinite object satisfy the following condition (4):

$$-2.7<f_{2G}/f<-1.2 \quad (4).$$

6. The imaging lens according to claim 1, wherein a curvature radius $R_{L3F}$ of an object-side face of the third lens and a distance $D_{L2\text{-}L3}$ from an image-side face of the second lens to an object-side face of the third lens satisfy the following condition (5):

$$-2.5<R_{L3F}/D_{L2\text{-}L3}<-1.0 \quad (5).$$

7. The imaging lens according to claim 1, wherein a synthetic focal length $f_{L1\text{-}L2}$ of the first and second lenses and a focal length f of an entire system in a state focused on an infinite object to satisfy the following condition (6):

$$1.0<f_{L1\text{-}L2}/f<1.8 \quad (6).$$

8. The imaging lens according to claim 1, wherein the fifth lens includes as an image-side face an aspheric shape in which a positive refractive power weakens in its peripheral portion.

9. The imaging lens according to claim 8, wherein a distance $L_{s\text{-}A}$ from the aperture stop to the aspheric surface of the fifth lens and a distance $L_{s\text{-}I}$ from the aperture stop to the image face satisfy the following condition (7):

$$0.25<L_{S\text{-}A}/L_{S\text{-}I}<0.55 \quad (7).$$

10. The imaging lens according to claim 1, wherein the first lens is only moved when focusing on a close-range object.

11. A camera comprising the imaging lens according to claim 1 as a photographing optical system.

12. A personal digital assistant comprising the imaging lens according to claim 1 as a photographing optical system of a camera function portion.

* * * * *